UNITED STATES PATENT OFFICE.

WILHELM BRAUN, OF FEUERBACH, NEAR STUTTGART, GERMANY, ASSIGNOR TO THE FIRM OF SAPONIA WERKE FERDINAND BOEHM, OF OFFENBACH-ON-THE-MAIN, GERMANY.

MANUFACTURE OF A CLEANING AND PROTECTING MATERIAL FOR METALS.

No. 862,305.  Specification of Letters Patent.  Patented Aug. 6, 1907.

Application filed January 3, 1906. Serial No. 294,471.

*To all whom it may concern:*

Be it known that I, WILHELM BRAUN, doctor of philosophy, a subject of the German Emperor, and a resident of Feuerbach, near Stuttgart, Germany, have invented certain new and useful Improvements in the Manufacture of a Cleaning and Protecting Material for Metals, of which the following is a specification.

The object of this invention is to provide a material for both cleaning and protecting metal articles and especially for cleaning gun barrels from residues and protecting them from rust.

According to this invention sodium hydroxid is dissolved in alcohol and the solution is intimately mixed with a suitable vehicle such as liquid and solid paraffin or other hydrocarbon. The active agent of the mixture is the sodium hydroxid which combines for example with the acid residues due to the explosion of powder in gun barrels and the compound formed can be easily removed with the alcohol and the vehicle such as hydrocarbon. The sodium hydroxid cannot be replaced by the corresponding potassium hydroxid because the latter attracts water and gives it off so that it tends to cause rusting instead of preventing it, whereas sodium hydroxid, under the action of the moisture and of the carbon dioxid in the air, is converted into sodium carbonate the moisture of the air forming in this, water of crystallization and the material according to this invention is therefore, on this account and also on account of the vehicles used an excellent protector against rust.

The following is an example of how this invention can be carried out. A solution of say from 10 to 12 per cent of sodium hydroxid in from 90 to 88 per cent of alcohol is stirred with a mixture consisting of equal parts of liquid and solid paraffin until a homogeneous unguent is produced which, when used for cleaning gun barrels for example, is applied to the cleaner and then passed through the gun-barrel, and after a short time, the cleaner is again passed through the gun-barrel which is thus thoroughly cleaned. The new material as compared with the mechanical cleaning means hitherto in use, has the advantage of being both more thorough and more rapid in its action.

Claims:

1. The herein described composition of matter for cleaning and protecting metal prepared by mixing a solution of alcohol and sodium hydroxid with a suitable hydrocarbon.

2. The herein described process of manufacturing a metal cleaning and protecting material consisting in dissolving sodium hydroxid in alcohol, and then mixing such solution with a suitable hydrocarbon.

3. The herein described composition of matter for cleaning and protecting the interior surfaces of gun barrels consisting of a mixture of paraffin and a solution of alcohol and sodium hydroxid.

In testimony whereof I have signed my name to this specification in the presence of two subscribing witnesses.

WILHELM BRAUN.

Witnesses:
C. WM. HAHN,
ERNST ENTENMAN.